United States Patent
Lee

(10) Patent No.: US 10,855,926 B2
(45) Date of Patent: Dec. 1, 2020

(54) AUTOMATIC OBJECT TRACKING SYSTEM AND AUTOMATIC OBJECT TRACKING METHOD

(71) Applicant: HEIMAVISTA INC., Taipei (TW)

(72) Inventor: Ching-Kang Lee, Taipei (TW)

(73) Assignee: HEIMAVISTA INC., Taipei (TW)

( * ) Notice: Subject to any disclaimer, the term of this patent is extended or adjusted under 35 U.S.C. 154(b) by 67 days.

(21) Appl. No.: 16/212,367

(22) Filed: Dec. 6, 2018

(65) Prior Publication Data
US 2020/0186719 A1    Jun. 11, 2020

(51) Int. Cl.
| | |
|---|---|
| H04N 5/232 | (2006.01) |
| G06T 7/246 | (2017.01) |
| G03B 17/56 | (2006.01) |
| G06T 7/50 | (2017.01) |
| H04M 1/725 | (2006.01) |

(52) U.S. Cl.
CPC ....... *H04N 5/23299* (2018.08); *G03B 17/561* (2013.01); *G06T 7/246* (2017.01); *G06T 7/50* (2017.01); *H04N 5/23218* (2018.08); *H04N 5/232935* (2018.08); *H04M 1/7253* (2013.01)

(58) Field of Classification Search
CPC .......... H04N 5/23299; H04N 5/23218; H04N 5/232935; G06T 7/246; G03B 17/561; H04M 1/7253
See application file for complete search history.

(56) References Cited

U.S. PATENT DOCUMENTS

| | | | |
|---|---|---|---|
| 2018/0352144 A1* | 12/2018 | Miao | G06K 9/6268 |
| 2019/0096069 A1* | 3/2019 | Qian | G06T 7/74 |
| 2019/0162358 A1* | 5/2019 | Wang | F16M 11/18 |

* cited by examiner

*Primary Examiner* — Michael J Hess
(74) *Attorney, Agent, or Firm* — Rabin & Berdo, P.C.

(57) ABSTRACT

An automatic object tracking system is configured to perform an automatic object tracking method. A horizontal coordinate axis and a vertical coordinate axis are defined in image capturing data captured by a handheld device. When a feature object is recognized, a sampling frame is defined to surround the feature object, and a reference point is defined within the sampling frame. A horizontal distance and a vertical distance from the reference point to a target coordinate is calculated. When the horizontal distance is larger than a horizontal threshold, a turning command is issued to move the reference point towards the target coordinate horizontally by at least one horizontal unit. When the vertical distance is larger than a vertical threshold, the turning command is issued to move the reference point in the image capturing data towards the target coordinate vertically by at least one vertical unit.

8 Claims, 12 Drawing Sheets

AUTOMATIC OBJECT TRACKING SYSTEM AND AUTOMATIC OBJECT TRACKING METHOD

BACKGROUND

Technical Field

The present invention relates to object tracking, and in particular, to an automatic object tracking system and an automatic object tracking method.

Related Art

When a user takes a selfie with a smartphone, in a conventional manner, similar to a camera, the smartphone is fixed by using a tripod or a fixing support in another form, and timed photographing or video recording is started. In this case, the smartphone is completely fixed, and the user can move in only a very small range to ensure that the user is photographed. Another tool is a selfie stick. A handle stick is used in place of a tripod, and a mechanism (a wired or wireless connection mechanism) that can actuate a shutter is provided. The user holds the stick to take a selfie. However, an imaging distance is limited by the length of the stick, and a selfie can only be taken at a short distance.

Currently, several video object tracking technologies have been developed, in which a tracking dock drives a camera to track a specific object. However, excessive tracking of this type of tracking dock causes a smartphone to continuously swivel to track the specific object. As a result, image capturing data (especially a dynamic video stream) is obviously shaky. Therefore, a tracking manner still needs to be improved.

SUMMARY

In view of the foregoing problem, the present invention proposes an automatic object tracking system and an automatic object tracking method, to resolve the problem that image capturing data is shaky due to excessive tracking of a specific object.

The present invention proposes an automatic object tracking system, including a handheld mobile device and a tracking dock.

The handheld mobile device includes: a microprocessor, configured to perform an object tracking mode; an image capturing unit, electrically connected to the microprocessor, and configured to captures an image capturing data in an image capturing direction and transfer the image to the microprocessor; wherein the microprocessor defines a horizontal coordinate axis and a vertical coordinate axis that are perpendicular to each other in image capturing data, defines a length of the image capturing data along the horizontal coordinate axis into a plurality of horizontal units, and defines a height of the image capturing data with respect to the horizontal coordinate axis into a plurality of vertical units; a memory unit, electrically connected to the microprocessor, and configured to store the image capturing data; a touch-control display panel, electrically connected to the microprocessor, and configured to display the image capturing data, receive a touch control operation, and feedback the touch control operation to the microprocessor; and a first communications interface, electrically connected to the microprocessor.

The tracking dock includes a controller; a second communications interface, electrically connected to the controller, and configured to establish a communications link to the first communications interface to receive a turning command and transfer the turning command to the controller; and a turning module, electrically connected to the controller, and configured to support the handheld mobile device; wherein the controller drives the turning module according to the turning command to turn, to change the image capturing direction of the image capturing unit.

In the object tracking mode, when the microprocessor recognizes a feature object from the image capturing data, the microprocessor sets a sampling frame to surround the feature object, and moves the sampling frame as the feature object moves; the microprocessor sets a reference point in the sampling frame, and calculates a horizontal distance and a vertical distance between the reference point and a target coordinate; when the horizontal distance is larger than a horizontal threshold, the microprocessor sends the turning command to drive the turning module to change the image capturing direction, to move the reference point towards the target coordinate horizontally by at least one horizontal unit; and when the vertical distance is larger than a vertical threshold, the microprocessor sends the turning command to control the turning module, to move the reference point in the image capturing data towards the target coordinate vertically by at least one vertical unit.

The present invention further proposes an automatic object tracking method, applicable to a handheld mobile device and a tracking dock between which a communications link is established; wherein the handheld mobile device captures image capturing data in an image capturing direction by using an image capturing unit, generates a turning command, and sends the turning command to the tracking dock, the tracking dock is configured to support the handheld mobile device, and receives a turning command to change the image capturing direction; the method includes the following steps: perform an object tracking mode on a feature object in the image capturing data; defining a horizontal coordinate axis and a vertical coordinate axis that are perpendicular to each other in the image capturing data, defining a length of the image capturing data along the horizontal coordinate axis into a plurality of horizontal units, and defining a height of the image capturing data with respect to the horizontal coordinate axis into a plurality of vertical units; when the feature object is recognized from the image capturing data, setting a sampling frame to surround the feature object, and setting a reference point in the sampling frame; and calculating a horizontal distance and a vertical distance between the reference point and a target coordinate; wherein when the horizontal distance is larger than a horizontal threshold, the turning command is issued to change the image capturing direction, to move the reference point towards the target coordinate horizontally by at least one horizontal unit; and when the vertical distance is larger than a vertical threshold, the turning command is issued to change the image capturing direction, to move the reference point in the image capturing data towards the target coordinate vertically by at least one vertical unit.

In the present invention, an image capturing direction is adjusted only when a displacement of a reference point exceeds a threshold. Therefore, in the technical measure provided in the present invention, a tracking motion of an image capturing unit does not follow a human face excessively, so that image capturing data is prevented from becoming excessively shaky, and the image capturing direction is gradually adjusted only when a movement distance is relatively large, so that the image capturing data can be relatively stable, and a manner of object tracking is relatively smooth.

DETAILED DESCRIPTION

Figure 1:
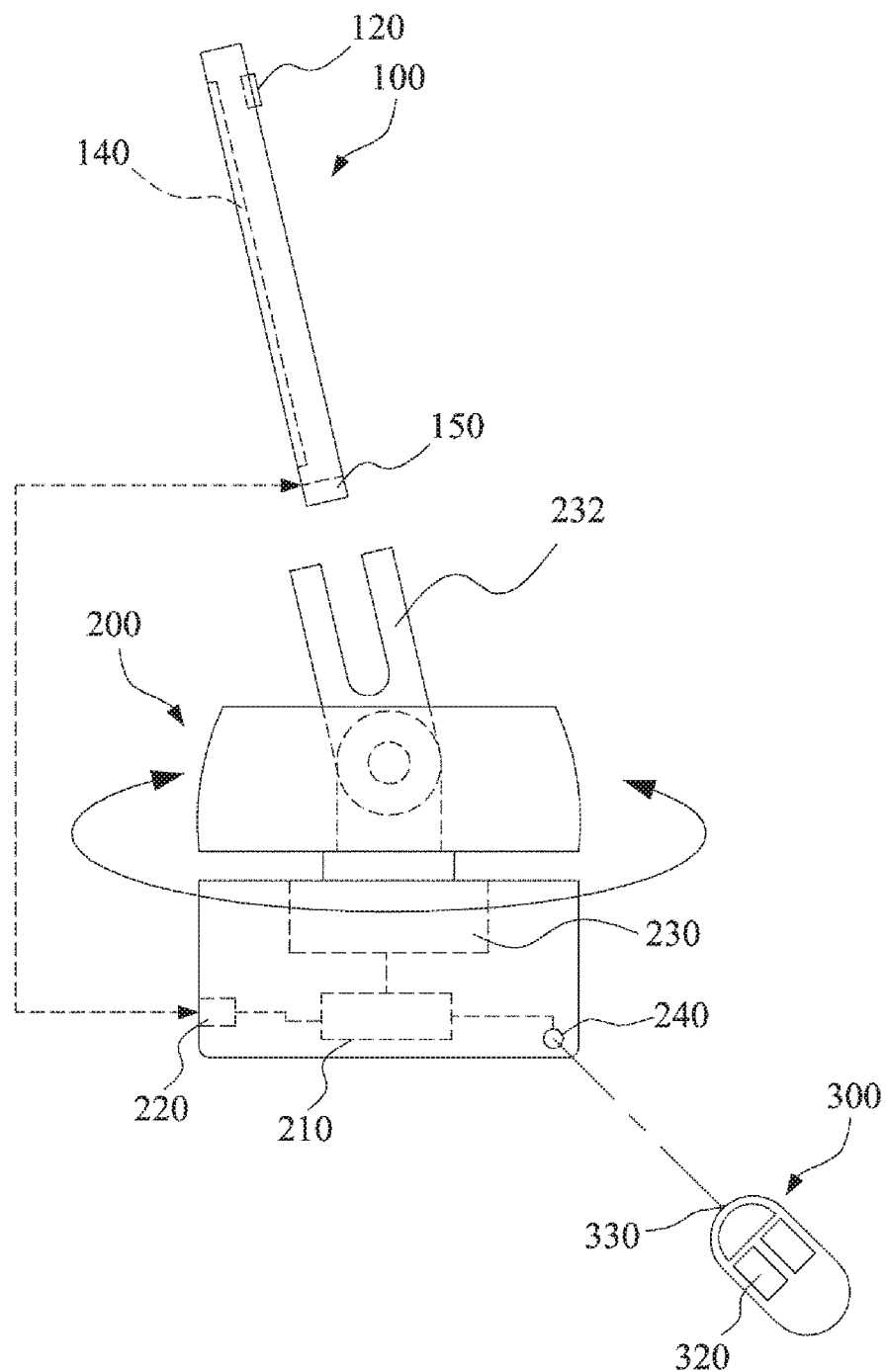
FIG. 1 is a schematic system diagram of an automatic object tracking system according to an embodiment of the present invention.
Figure 2:
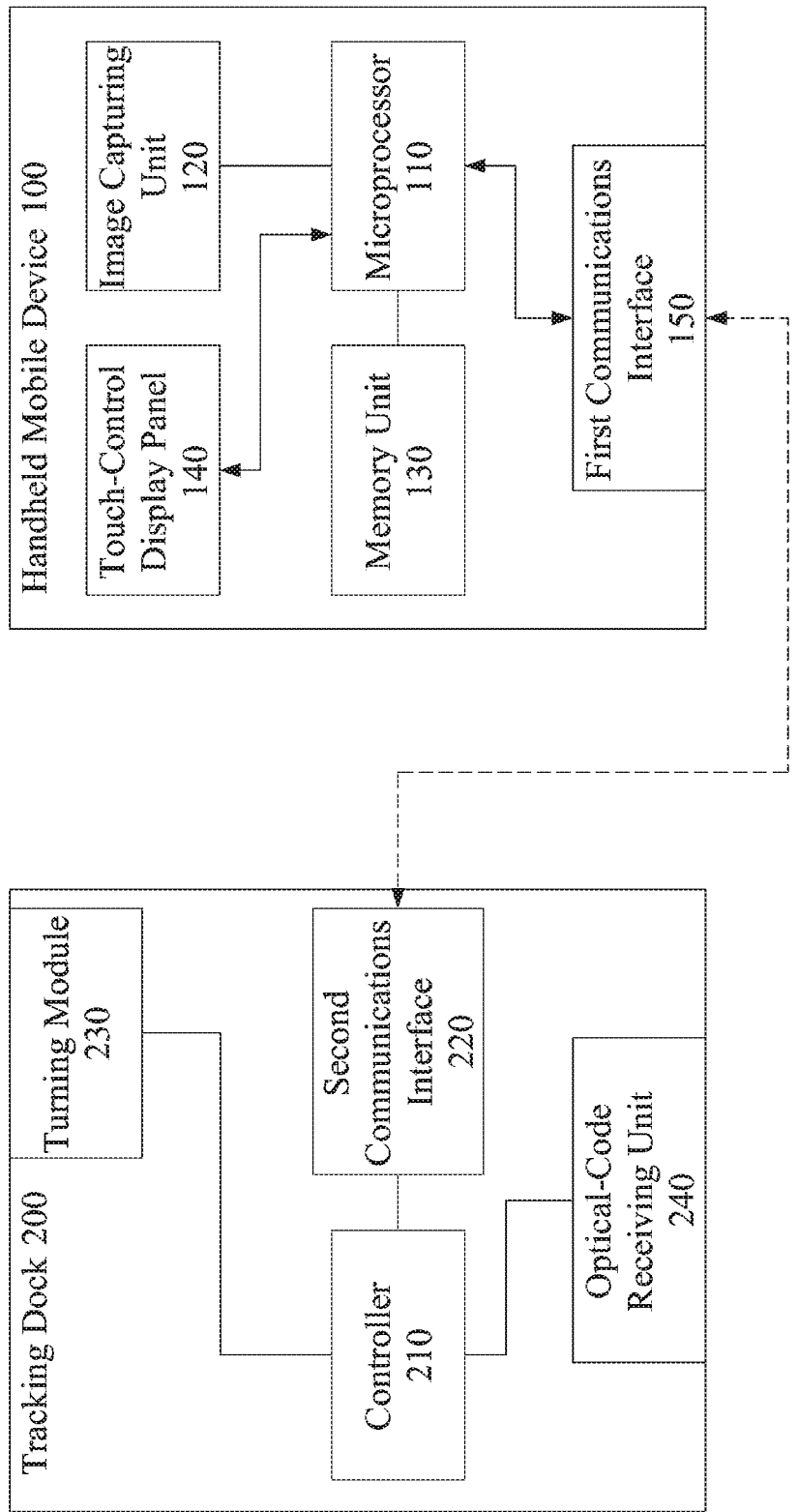
FIG. 2 is a circuit block diagram of a handheld mobile device and a tracking dock according to an embodiment of the present invention.

As shown in FIG. 1 and FIG. 2, an automatic object tracking system disclosed in an embodiment of the present invention is configured to perform an automatic object tracking method. The automatic object tracking system includes a handheld mobile device 100, a tracking dock 200, and a remote control device 300. The handheld mobile device 100 is supported on the tracking dock 200, and is configured to captures an image capturing data M in an image capturing direction. The handheld mobile device 100 controls the tracking dock 200 to turn, to change the image capturing direction of the handheld mobile device 100 to track a feature object A.

The handheld mobile device 100 may be an electronic apparatus such as a smartphone or a tablet computer that has an image capturing function and a video recording function and may establish a communications link with the tracking dock 200.

As shown in FIG. 1 and FIG. 2, the handheld mobile device 100 includes a microprocessor 110, an image capturing unit 120, a memory unit 130, a touch-control display panel 140, and a first communications interface 150.

As shown in FIG. 1 and FIG. 2, the image capturing unit 120, the memory unit 130, and the touch-control display panel 140 are electrically connected to the microprocessor 110. The image capturing unit 120 is configured to capture the image capturing data M, transfer the image capturing data M to the microprocessor 110, and transmit the image capturing data M to the memory unit 130 to store the image capturing data M.

As shown in FIG. 2, the memory unit 130 stores, in addition to the image capturing data M, an operating system and an object tracking application program for the microprocessor 110 to load and perform an object tracking mode.

As shown in FIG. 1 and FIG. 2, the touch-control display panel 140 is electrically connected to the microprocessor 110, and is configured to display the image capturing data M, receive a touch control operation, and feedback the touch control operation to the microprocessor 110.

As shown in FIG. 1 and FIG. 2, the first communications interface 150 is electrically connected to the microprocessor 110, and is configured to establish a communications link. The first communications interface 150 may be a wired communications interface, for example, a USB interface, or may be a wireless communications interface, for example, Bluetooth, an RF communications interface, and a Wi-Fi interface (supporting Wi-Fi Direct).

As shown in FIG. 1 and FIG. 2, the tracking dock 200 includes a controller 210, a second communications interface 220, a turning module 230, and an optical-code receiving unit 240.

As shown in FIG. 1 and FIG. 2, the second communications interface 220 is electrically connected to the controller 210, and is configured to establish a communications link with the first communications interface 150, so that the controller 210 of the tracking dock 200 establishes a communications link with the handheld mobile device 100.

As shown in FIG. 1 and FIG. 2, the turning module 230 is electrically connected to the controller 210, and is configured to support the handheld mobile device 100. The controller 210 drives the turning module 230 according to a turning command to turn, to enable the turning module 230 to rotate or incline the handheld mobile device 100 horizontally and vertically to change the image capturing direction.

The turning module 230 usually includes one or more motors, a necessary gear box, and a fixture 232. The fixture 232 is configured to hold the handheld mobile device 100 to support the handheld mobile device 100 on the turning module 230. A combination of the motor and the gear box is configured to rotate the fixture 232 in one or more axial directions. A combination of the motor, the gear box, and the fixture 232 is common knowledge in the technical field of the present invention, and details of the technical measure of the combination are not described in detail.

As shown in FIG. 1 and FIG. 2, the optical-code receiving unit 240 is electrically connected to the controller 210, and is configured to receive an optical-code signal that carries a tracking-start code, and transfer the optical-code signal to the controller 210, to enable the controller 210 to trigger the microprocessor 110 when the tracking-start code is received to start to perform the object tracking mode.

Figure 3:
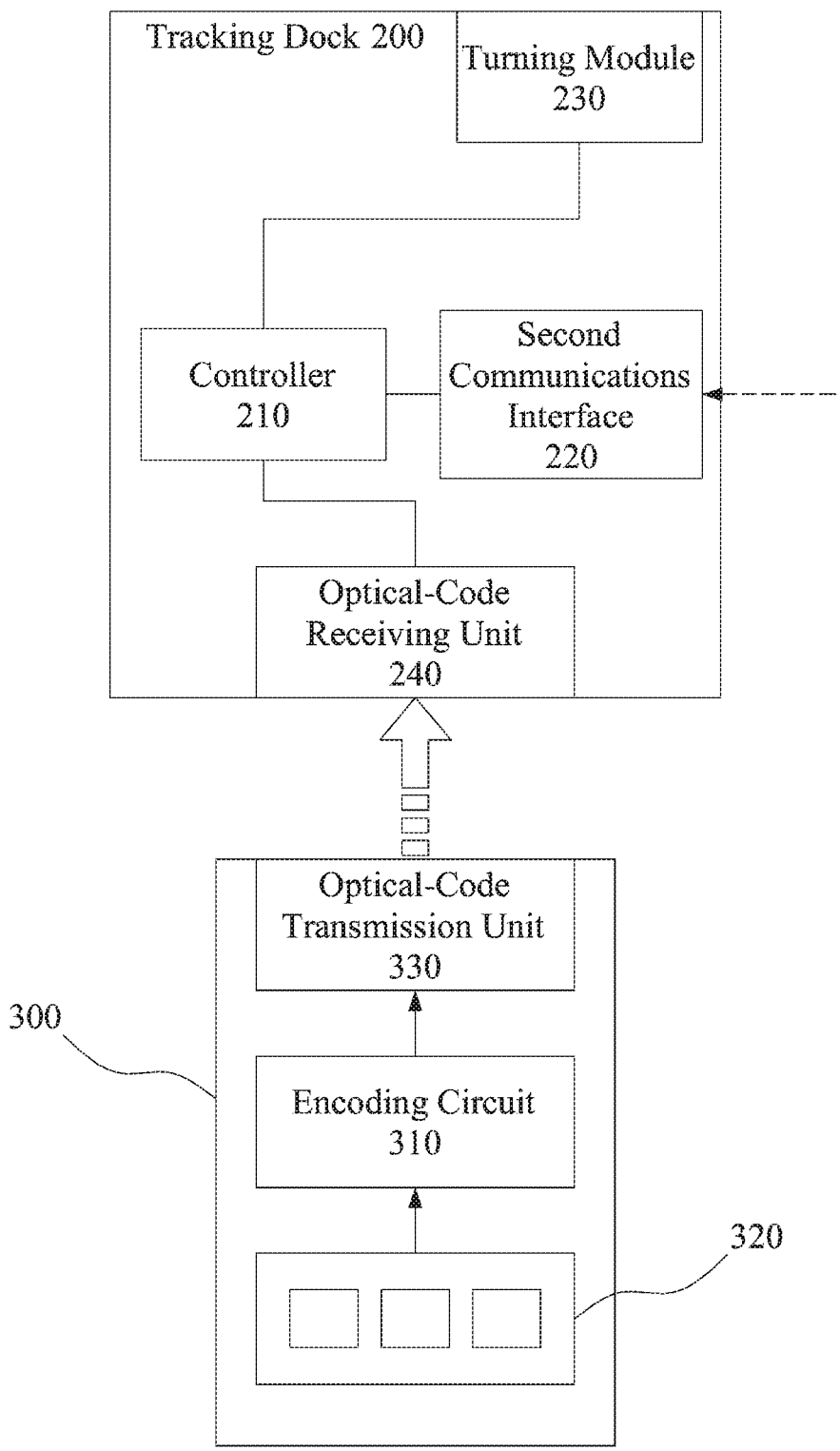
FIG. 3 is a circuit block diagram of a tracking dock and a remote control device according to an embodiment of the present invention.

As shown in FIG. 1 and FIG. 3, the remote control device 300 includes an encoding circuit 310, a key group 320, and an optical-code transmission unit 330.

The encoding circuit 310 stores at least one tracking-start code. The tracking-start code corresponds to a dedicated tracking dock 200. The optical-code transmission unit 330 is electrically connected to the encoding circuit 310. When the key group 320 is pressed to form a specific key combination (keys are pressed at the same time, or a single key is rapidly pressed a specific number of times), the key group 320 triggers the encoding circuit 310 to drive the optical-code transmission unit 330 to emit the optical-code signal that carries the tracking-start code, so that the optical-code receiving unit 240 of the tracking dock 200 receives the optical-code signal that carries the tracking-start code.

As shown in FIG. 2 and FIG. 3, when the optical-code receiving unit 240 receives the tracking-start code, the controller 210 determines whether the tracking-start code is dedicated. If the tracking-start code is dedicated, the controller 210 triggers the microprocessor 110 to start to perform the object tracking mode. If the tracking-start code is not dedicated, or the optical-code signal does not carry the tracking-start code, the controller 210 does not trigger the microprocessor 110 to perform the object tracking mode, or further triggers the microprocessor 110 to disable the object tracking mode.

Figure 4:
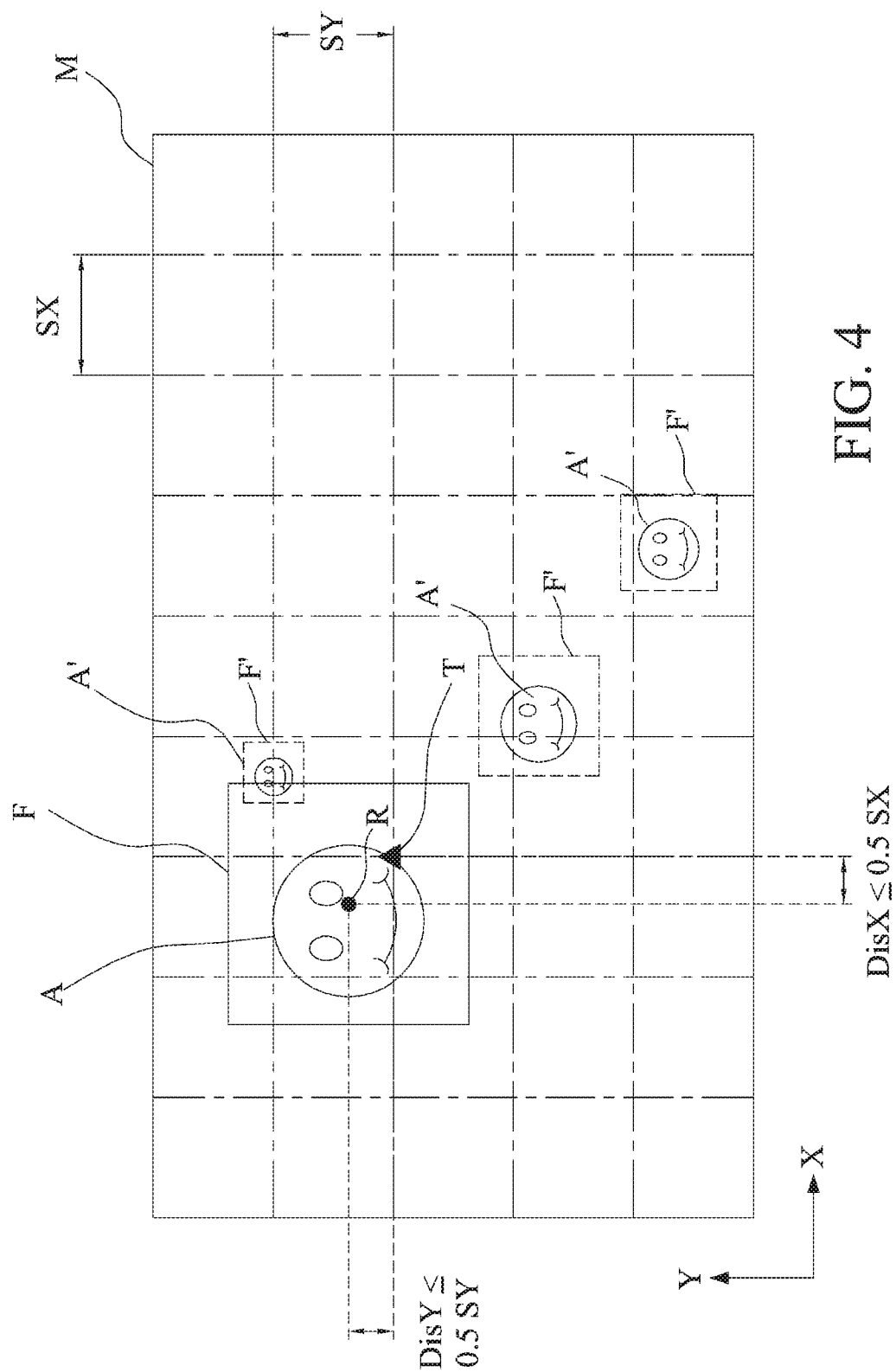
FIG. 4 is a schematic diagram of generating a sampling frame and a reference point according to a feature object according to an embodiment of the present invention.

As shown in FIG. 4, the microprocessor 110 defines a horizontal coordinate axis X and a vertical coordinate axis Y that are perpendicular to each other in the image capturing data M, defines a length of the image capturing data M along the horizontal coordinate axis X into a plurality of horizontal units SX, and defines a height of the image capturing data M with respect to the horizontal coordinate axis X into a plurality of vertical units SY.

After the handheld mobile device 100 performs the object tracking mode, the microprocessor 110 recognizes the feature object A, for example, a human face, from the image capturing data M. If the feature object A is not recognized from the image capturing data M, the microprocessor 110 issues the turning command to control the tracking dock 200 to continuously change the image capturing direction until the feature object A is recognized from the image capturing data M.

As shown in FIG. 4, after the feature object A is recognized, the microprocessor 110 sets a sampling frame F to surround the feature object A and moves the sampling frame F as the feature object A moves, so that the feature object A stays in the sampling frame F. The microprocessor 110 may adjust an image scale of the image capturing unit 120 in real time, to keep a proportion of the sampling frame F in the image capturing data M unchanged. The microprocessor 110 sets a reference point R in the sampling frame F.

As shown in FIG. 4, if the microprocessor 110 recognizes a plurality of feature objects A and A' at the same time, the microprocessor 110 sets sampling frames F and F' for the plurality of feature objects A and A' respectively, and performs the object tracking mode by using a sampling frame F having the largest area. Alternatively, a user may use the touch-control display panel 140 to choose a feature object A on which the object tracking mode needs to be performed.

As shown in FIG. 4, the microprocessor 110 calculates a horizontal distance Dis X and a vertical distance Dis Y between the reference point R and a target coordinate T. The foregoing target coordinate T may be preset and stored in the memory unit 130 and loaded by the microprocessor 110. For example, the preset target coordinate T may be located at a central position of the image capturing data M. The target coordinate T may be directly chosen by the user with a tap on the touch-control display panel 140. In addition, the user may manually operate on the touch-control display panel 140 to draw the sampling frame F to change the feature object A to be tracked to, for example, another human face.

The microprocessor 110 loads a horizontal threshold and a vertical threshold from the memory unit 130. The horizontal threshold is usually less than one horizontal unit SX, and the vertical threshold is usually less than one vertical unit SY.

Figure 5:
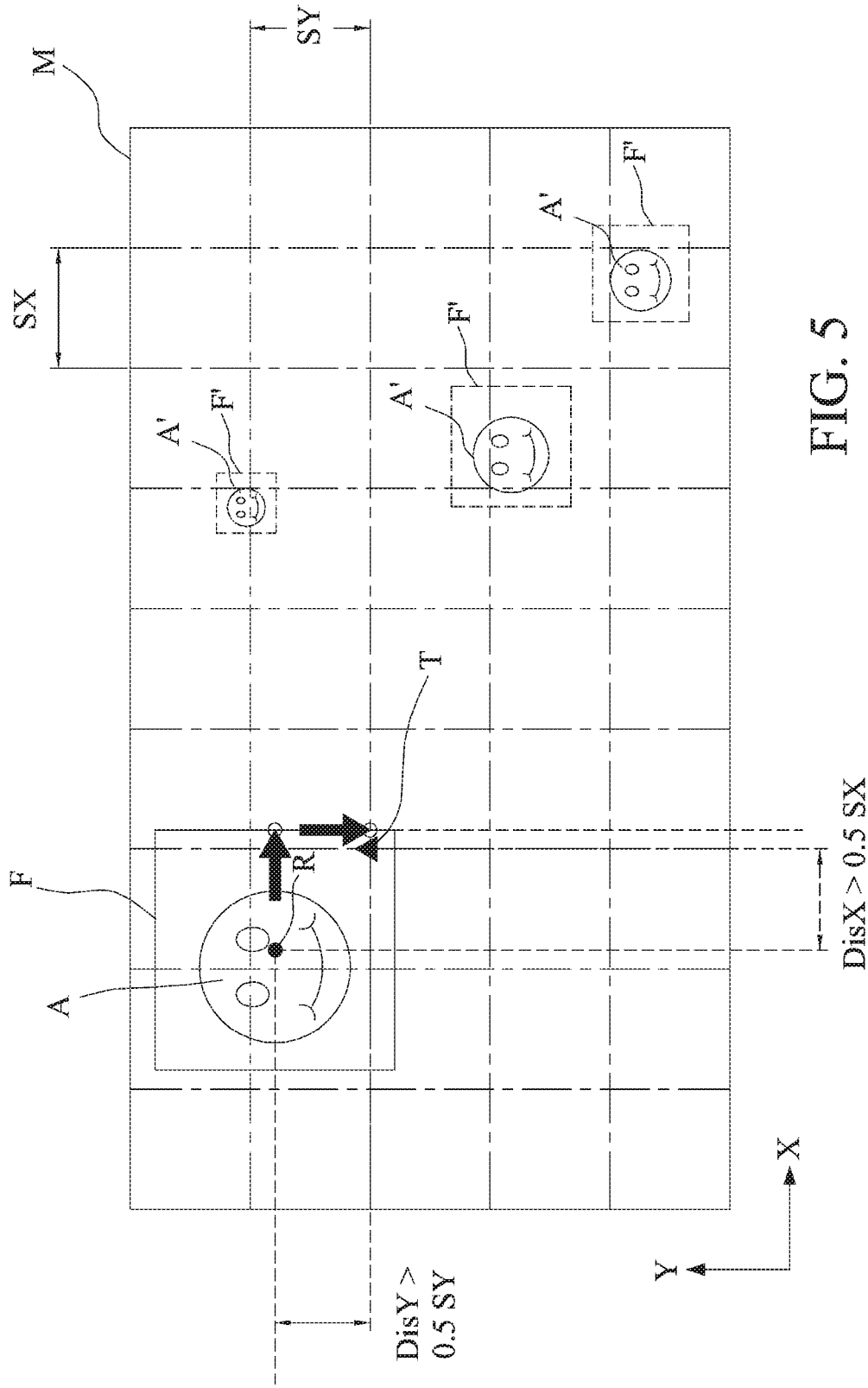
FIG. 5 is a schematic diagram of changing an image capturing direction according to a reference point and a target coordinate according to an embodiment of the present invention.

As shown in FIG. 5, when the horizontal distance Dis X is larger than the horizontal threshold, the microprocessor 110 sends the turning command to control the turning module 230 by using the controller 210 to change the image capturing direction, to enable the image capturing direction to rotate in a horizontal direction, so that the reference point R moves towards the target coordinate T horizontally by at least one horizontal unit SX. In fact, a rotational direction of the turning module 230 in the horizontal direction is opposite to a horizontal movement direction of the reference point R in the image capturing data M. Similarly, when the vertical distance Dis Y is larger than the vertical threshold, the microprocessor 110 controls the turning module 230 to change the image capturing direction, to enable the image capturing direction to change a vertical tilt, so that the reference point R moves towards the target coordinate T vertically by at least one vertical unit SY. In fact, a direction in which the turning module 230 changes a tilt is opposite to a vertical movement direction of the reference point R in the image capturing data M.

As shown in FIG. 4, in an example, the horizontal threshold is 0.5 horizontal unit SX, and the vertical threshold is 0.5 vertical unit SY. When the horizontal distance Dis X is less than 0.5 horizontal unit SX, the microprocessor 110 does not control the turning module 230 to operate; and when the vertical distance Dis Y is less than 0.5 vertical unit SY, the microprocessor 110 does not control the turning module 230 to operate.

As shown in FIG. 5, when the horizontal distance Dis X is larger than 0.5 horizontal unit SX, the microprocessor 110 controls the turning module 230 by using the controller 210, to enable the reference point R to move towards the target coordinate T horizontally by one horizontal unit SX. The microprocessor 110 may further load an advanced horizontal threshold. For example, when the horizontal distance Dis X is larger than 1.5 horizontal units SX, the microprocessor 110 controls the turning module 230, to enable the reference point R to move towards the target coordinate T horizontally by two horizontal units SX.

As shown in FIG. 5, similarly, when the vertical distance Dis Y is larger than 0.5 vertical unit SY, the microprocessor 110 controls the turning module 230 by using the controller 210 to enable the reference point R to move towards the target coordinate T vertically by one vertical unit SY. The microprocessor 110 may further load an advanced vertical threshold. For example, when the vertical distance Dis Y is larger than 1.5 vertical units SY, the microprocessor 110 controls the turning module 230, to enable the reference point R to move towards the target coordinate T in the image capturing data M horizontally by two vertical units SY. The reference point R may move along the horizontal coordinate axis X and the vertical coordinate axis Y synchronously or sequentially.

Figure 6:
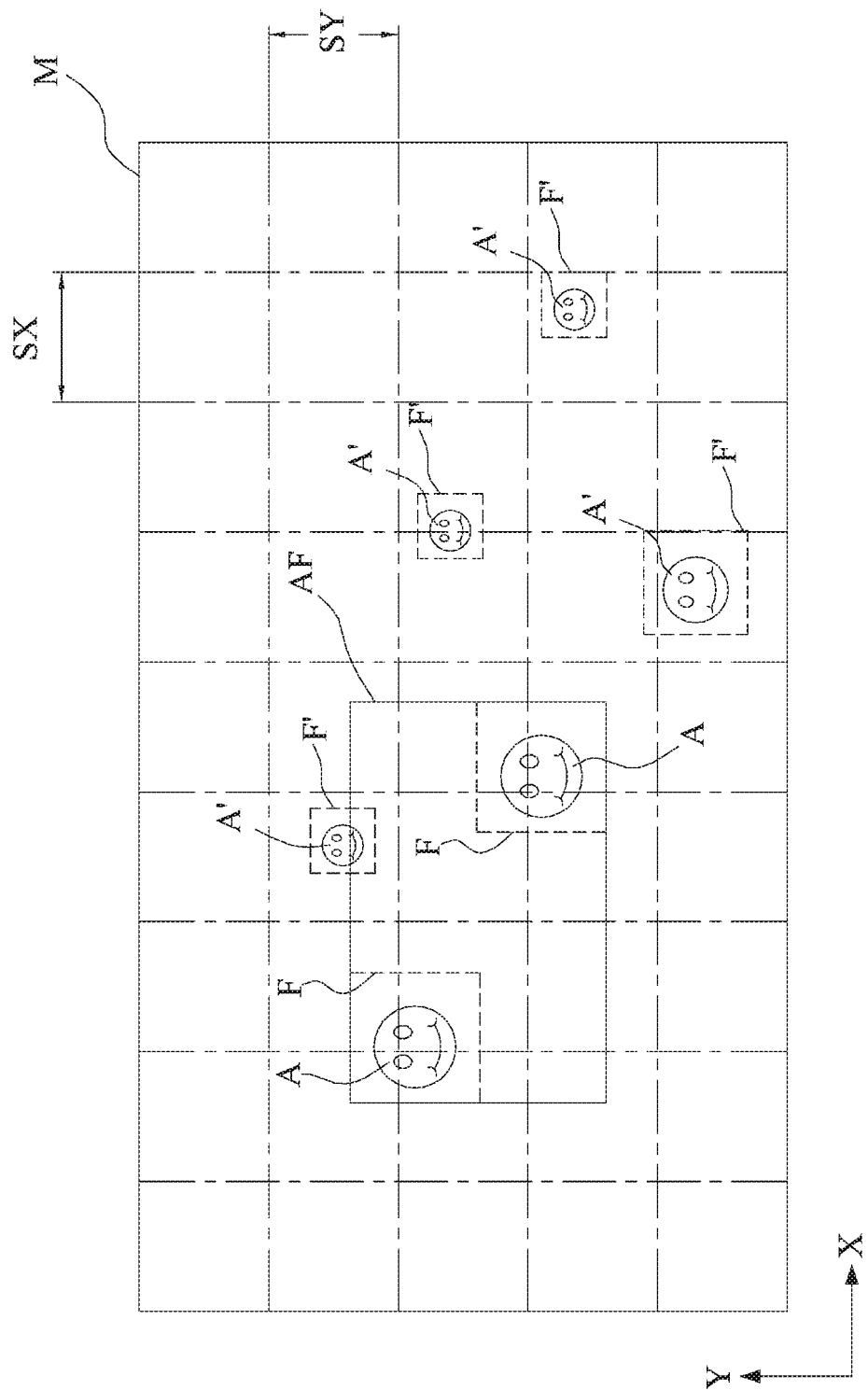
FIG. 6 is a schematic diagram of choosing some of a plurality of sampling frames and performing an object tracking mode according to an embodiment of the present invention.

As shown in FIG. 6, in another object tracking method of the present invention, when a plurality of feature objects A and A' is recognized, the microprocessor 110 sets sampling frames F and F' for the plurality of feature objects A and A' respectively, then chooses, according to a required tracking quantity in descending order of area, sampling frames F meeting the tracking quantity as tracking objects, sets an auxiliary frame AF surrounding the chosen sampling frames F, and sets, by using the auxiliary frame AF as a range, the reference point R between the sampling frames F, to perform the object tracking mode. The tracking quantity may be two or more or all.

Figure 7:
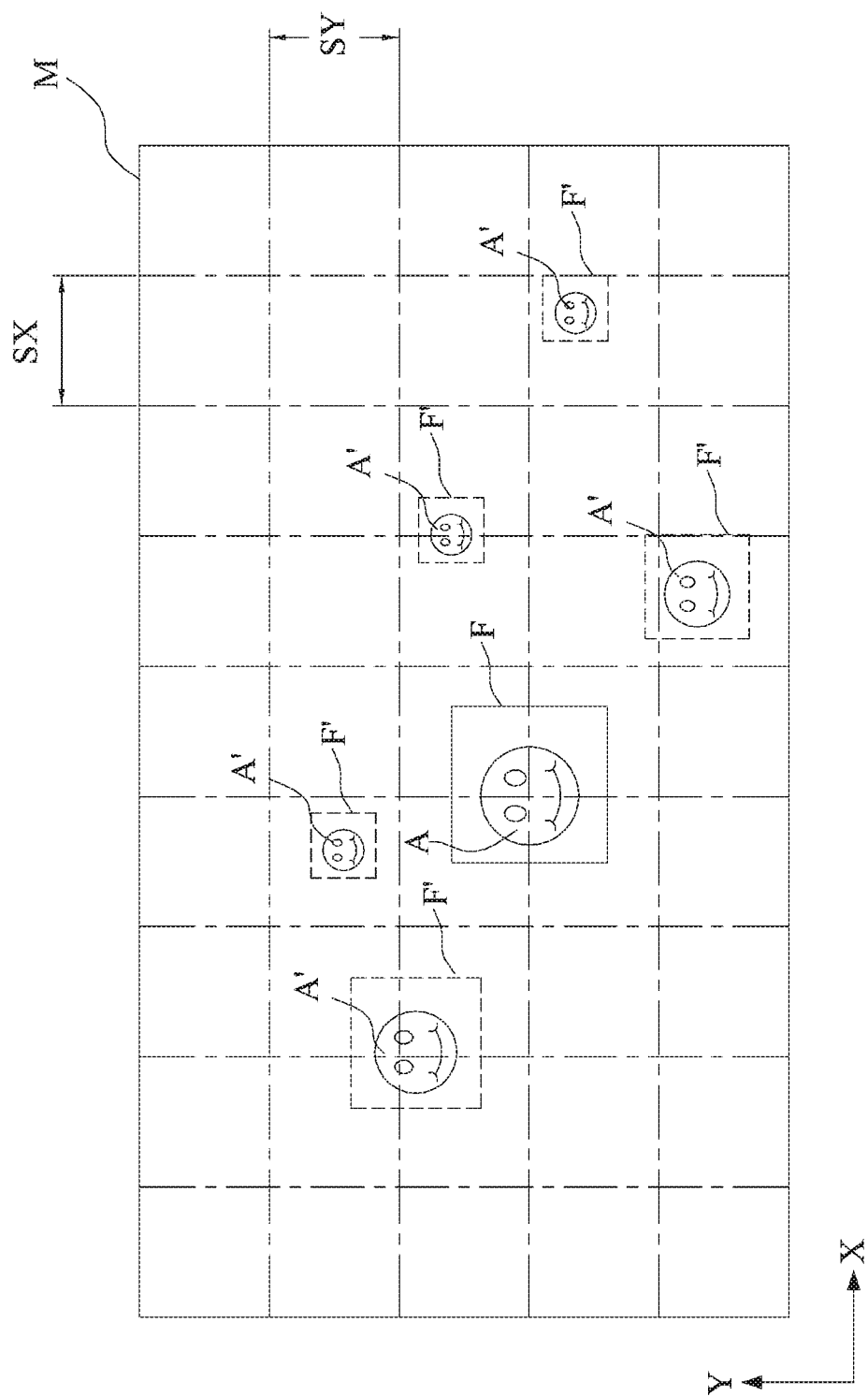
FIG. 7 and FIG. 8 are schematic diagrams of continuously performing an object tracking mode by using a sampling frame having the largest area according to an embodiment of the present invention.
Figure 8:
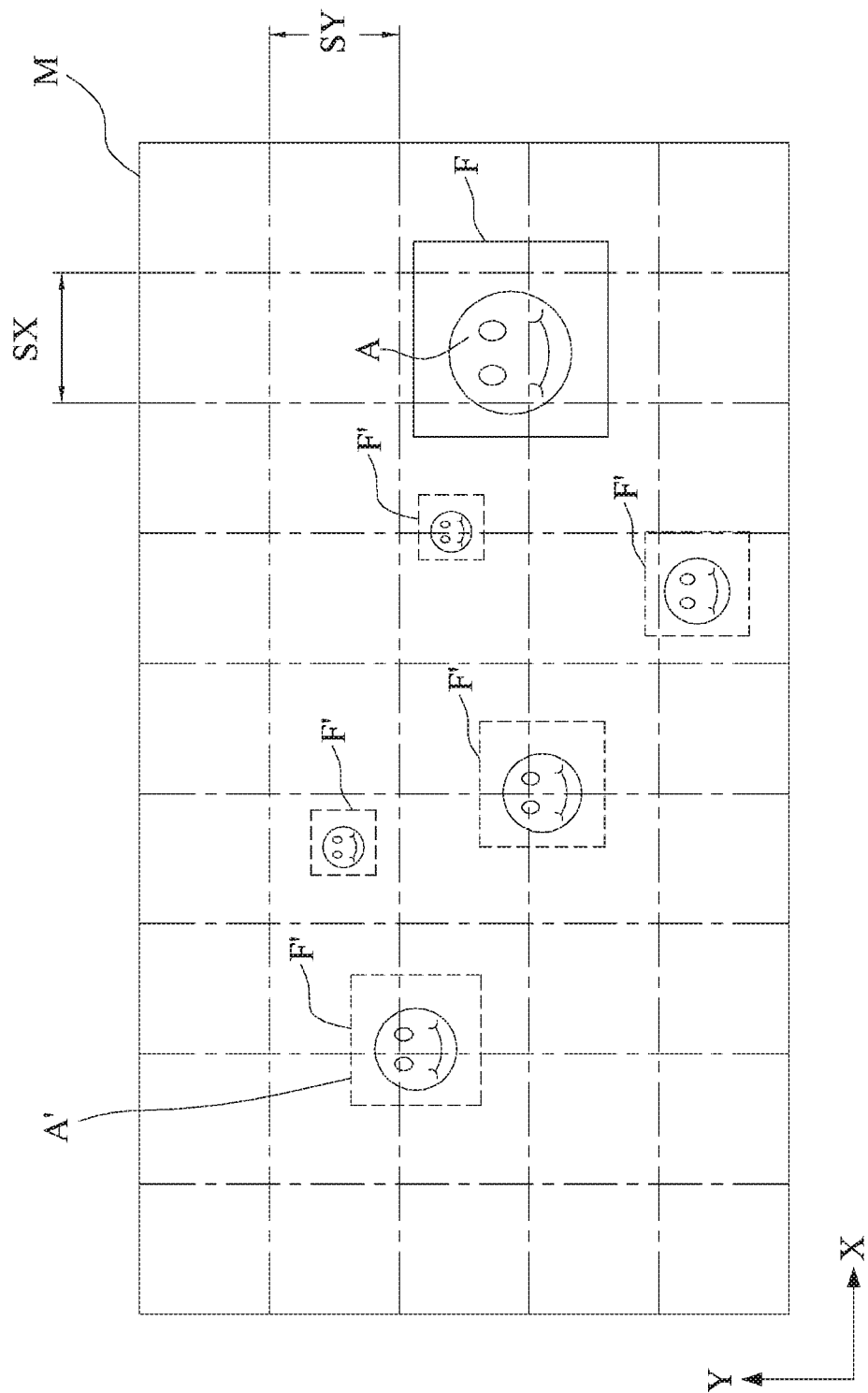

As shown in FIG. 7 and FIG. 8, in another object tracking method of the present invention, when a plurality of feature objects A and A' is recognized, the microprocessor 110 sets sampling frames F for the plurality of feature objects A and A' respectively, and a sampling frame F having the largest area is used as a tracking object. The microprocessor 110 continuously compares changing sizes of the sampling frames F and changes the tracking object in real time to a sampling frame F having the largest area currently. When many people are photographed in the image capturing data M, the image capturing unit 120 may change at any time the tracking object to a human face that is closest to the image capturing unit 120 (the sampling frame F having the largest area).

Figure 9:
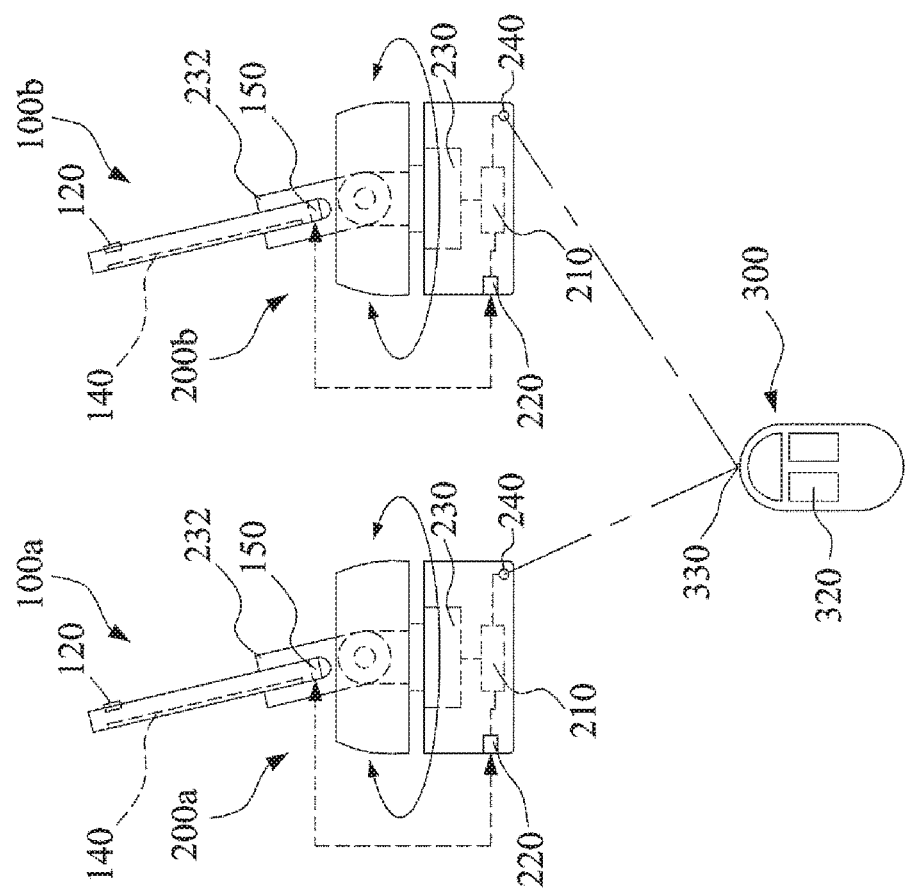
FIG. 9 is a schematic diagram of choosing one of a plurality of groups of handheld mobile devices and tracking docks by using a remote control device to enable an object tracking mode according to an embodiment of the present invention.

FIG. 9 shows an automatic object tracking system proposed in another embodiment of the present invention. This automatic object tracking system includes several groups of a handheld mobile device 100a and a handheld mobile device 100b and a tracking dock 200a and a tracking dock 200b that have established communications links in pair respectively, and each of the tracking dock 200a and the tracking dock 200b stores a corresponding tracking-start code. Here, according to the corresponding different tracking dock 200a and tracking dock 200b, a first tracking-start code and a second tracking-start code are distinguished. The first tracking dock 200a corresponds to the first tracking-start code, and the second tracking dock 200b corresponds to the second tracking-start code.

A key group 320 may send the first tracking-start code, the second tracking-start code, and a stop code separately according to different key combinations. For example, the first tracking-start code is issued when the key group 320 is pressed once, the second tracking-start code is issued when the key group 320 is pressed rapidly twice, and the stop code is issued when the key group 320 is pressed and held for a period of time or another key group 320 is pressed. The foregoing key combinations are only examples, and different pressing modes or combinations of a plurality of keys may be used.

When a remote control device 300 sends a remote control signal that carries the first tracking-start code and the remote control signal is received by the first tracking dock 200a, a controller 210 of the first tracking dock 200a may recognize that the remote control signal carries the first tracking-start code and trigger the first handheld mobile device 100a supported on the first tracking dock 200a. When receiving the remote control signal that carries the first tracking-start code, the second tracking dock 200b recognizes no second tracking-start code and therefore does not operate. Alternatively, when receiving the first tracking-start code, the second tracking dock 200b may recognize the first tracking-start code as the stop code and trigger a stop of object tracking.

In comparison, when the remote control device 300 sends a remote control signal that carries the second tracking-start code and the remote control signal is received by the second tracking dock 200b, a controller 210 of the second tracking dock 200b may recognize that the remote control signal carries the second tracking-start code and trigger the second handheld mobile device 100b supported on the second tracking dock 200b. When the first tracking dock 200a receives the remote control signal that carries the second tracking-start code, the first tracking dock 200a recognizes no first tracking-start code and therefore does not operate. Alternatively, when receiving the second tracking-start code, the first tracking dock 200a may recognize the second tracking-start code as the stop code and trigger a stop of object tracking.

When the remote control device 300 sends the remote control signal that carries the stop code and the remote control signal is received by the first tracking dock 200a and the second tracking dock 200b, the first tracking dock 200a and the second tracking dock 200b may trigger the first handheld mobile device 100a and the second handheld mobile device 100b respectively to stop object tracking.

Figure 10:
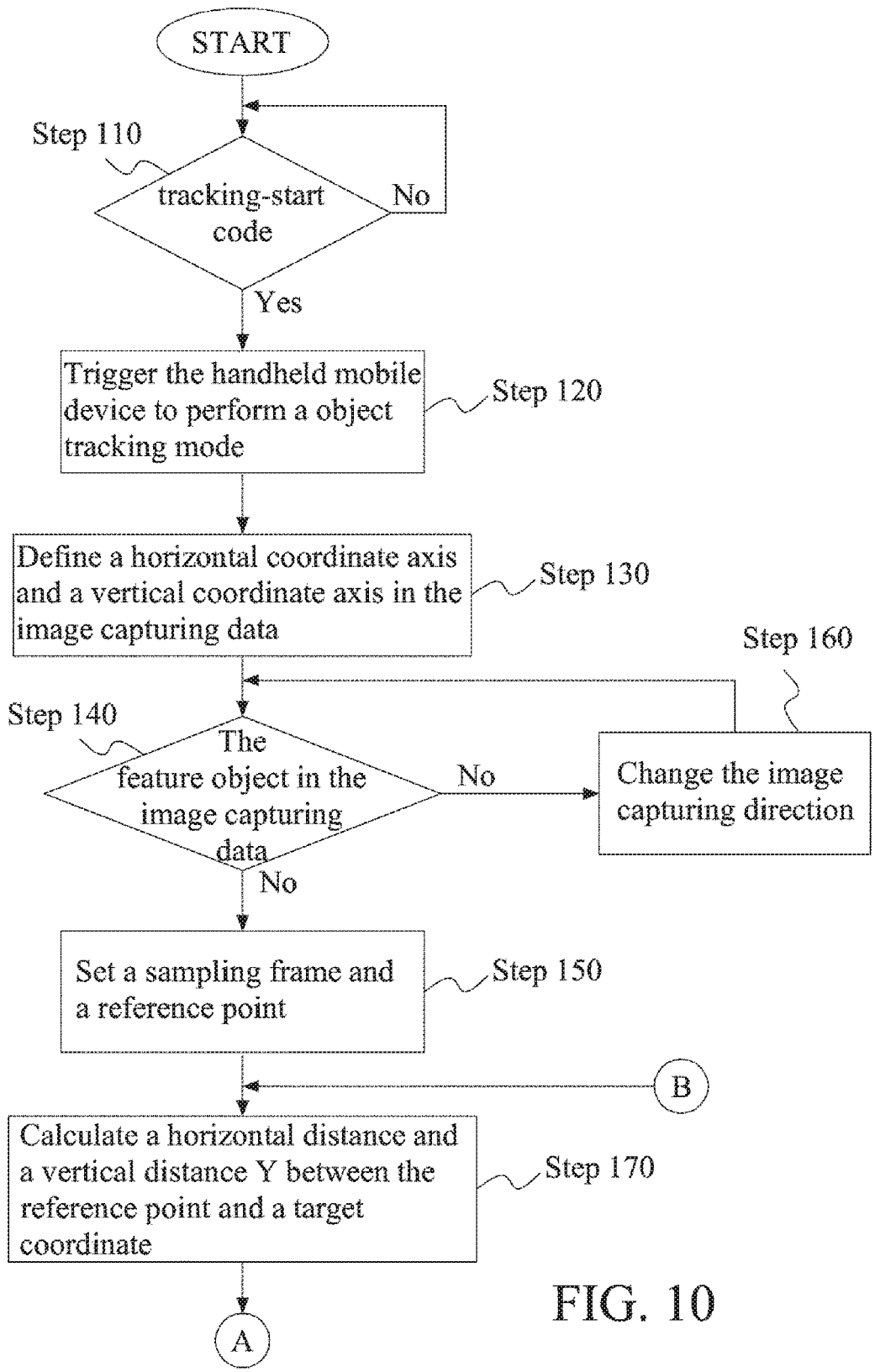
FIG. 10 and FIG. 11 are a flowchart of an automatic object tracking method according to the present invention.
Figure 11:
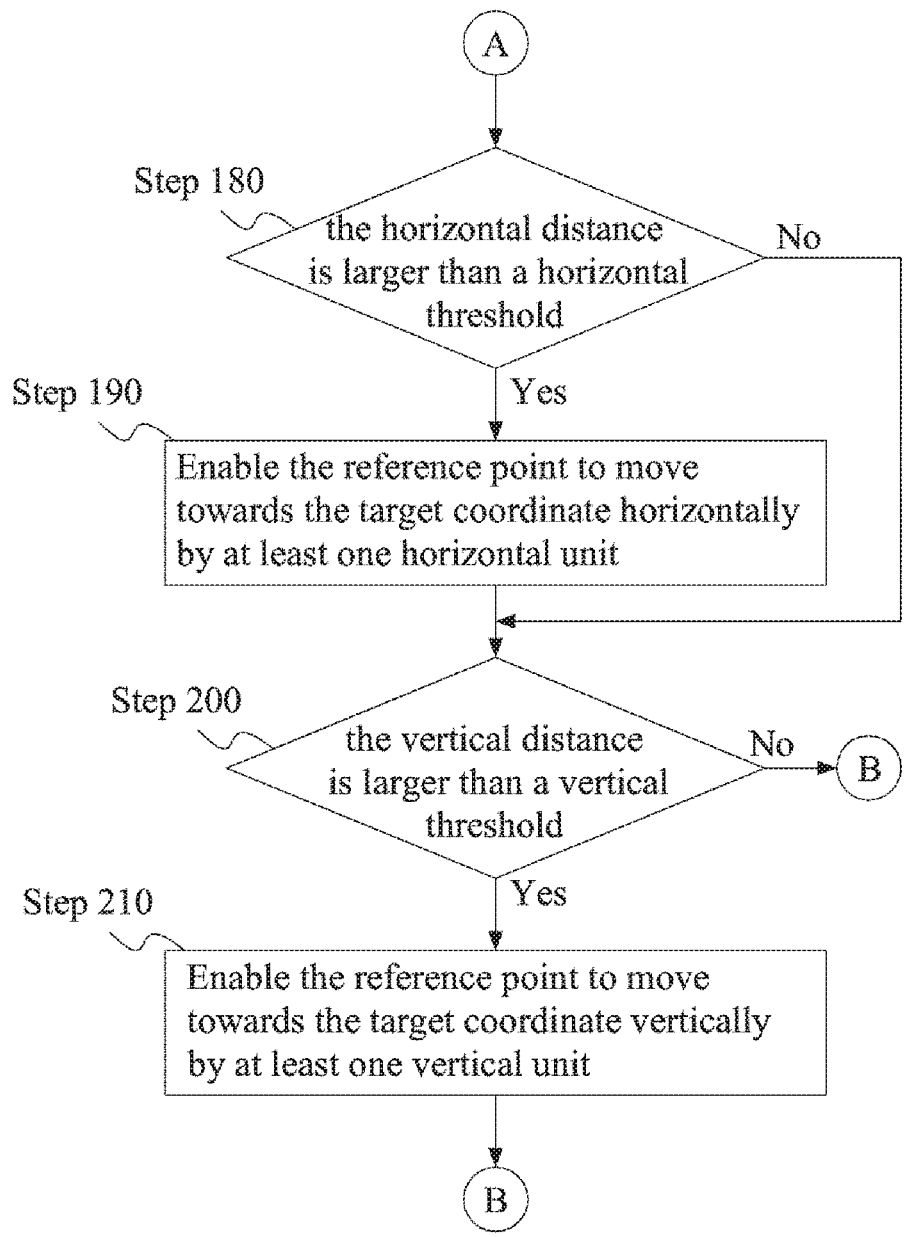

Referring to FIG. 10 and FIG. 11, the present invention further proposes an automatic object tracking method, applicable to a handheld mobile device 100 and a tracking dock 200 between which a communications link is established. The handheld mobile device 100 captures an image capturing data M in an image capturing direction by using an image capturing unit 120, generates a turning command, and sends the turning command to the tracking dock 200. The tracking dock 200 is configured to support the handheld mobile device 100, and receive the turning command to change the image capturing direction.

First, the tracking dock 200 receives a tracking-start code to trigger the handheld mobile device 100 to perform an object tracking mode, to perform the object tracking mode on a feature object A in the image capturing data M, as shown in Step 110 and Step 120.

In the Step 110, the tracking dock 200 continuously waits for an optical-code signal issued by a remote control device 300, and performs comparison to determine whether the optical-code signal includes the tracking-start code. If the optical-code signal includes the tracking-start code, Step 120 is performed. If the optical-code signal does not include the tracking-start code, the tracking dock 200 waits to receive a next optical-code signal. The transmission and reception of an optical-code signal are disclosed in the foregoing descriptions of the implementation of the automatic object tracking system, and are not described below in detail again.

The handheld mobile device 100 defines a horizontal coordinate axis X and a vertical coordinate axis Y that are perpendicular to each other in the image capturing data M, defines a length of the image capturing data M along the horizontal coordinate axis X into a plurality of horizontal units SX, and defines a height of the image capturing data M with respect to the horizontal coordinate axis X into a plurality of vertical units SY, as shown in Step 130.

The handheld mobile device 100 continuously recognizes whether the image capturing data M includes the feature object A, as shown in Step 140.

When the feature object A is recognized from the image capturing data M, the handheld mobile device 100 sets a sampling frame F to surround the feature object A to enable the sampling frame F to surround the feature object A, and sets a reference point R in the sampling frame F, as shown in Step 150.

In Step 140, if the feature object A is not recognized from the image capturing data M, a microprocessor 110 sends the turning command to control the tracking dock 200 to continuously change the image capturing direction, as shown in Step 160. Recognition is performed repeatedly and the image capturing direction is changed repeatedly until the feature object A is recognized from the image capturing data M.

After Step 150, the handheld mobile device 100 calculates a horizontal distance Dis X and a vertical distance Dis Y between the reference point R and a target coordinate T, as shown in Step 170.

When the horizontal distance Dis X is larger than a horizontal threshold, the handheld mobile device 100 sends the turning command to change the image capturing direction, to enable the reference point R to move towards the target coordinate T horizontally by at least one horizontal unit SX, as shown in Step 180 and Step 190. If the horizontal distance Dis X is not larger than a horizontal threshold, Step 190 is skipped, and Step 200 is directly performed.

When the vertical distance Dis Y is larger than a vertical threshold, the handheld mobile device 100 sends the turning command to change the image capturing direction, to enable the reference point R in the image capturing data M to move towards the target coordinate T vertically by at least one vertical unit SY, as shown in Step 200 and Step 210. Then, go back to Step 170. If the vertical distance Dis Y is not larger than the vertical threshold, Step 210 is skipped, and Step 170 is directly performed.

Figure 12:
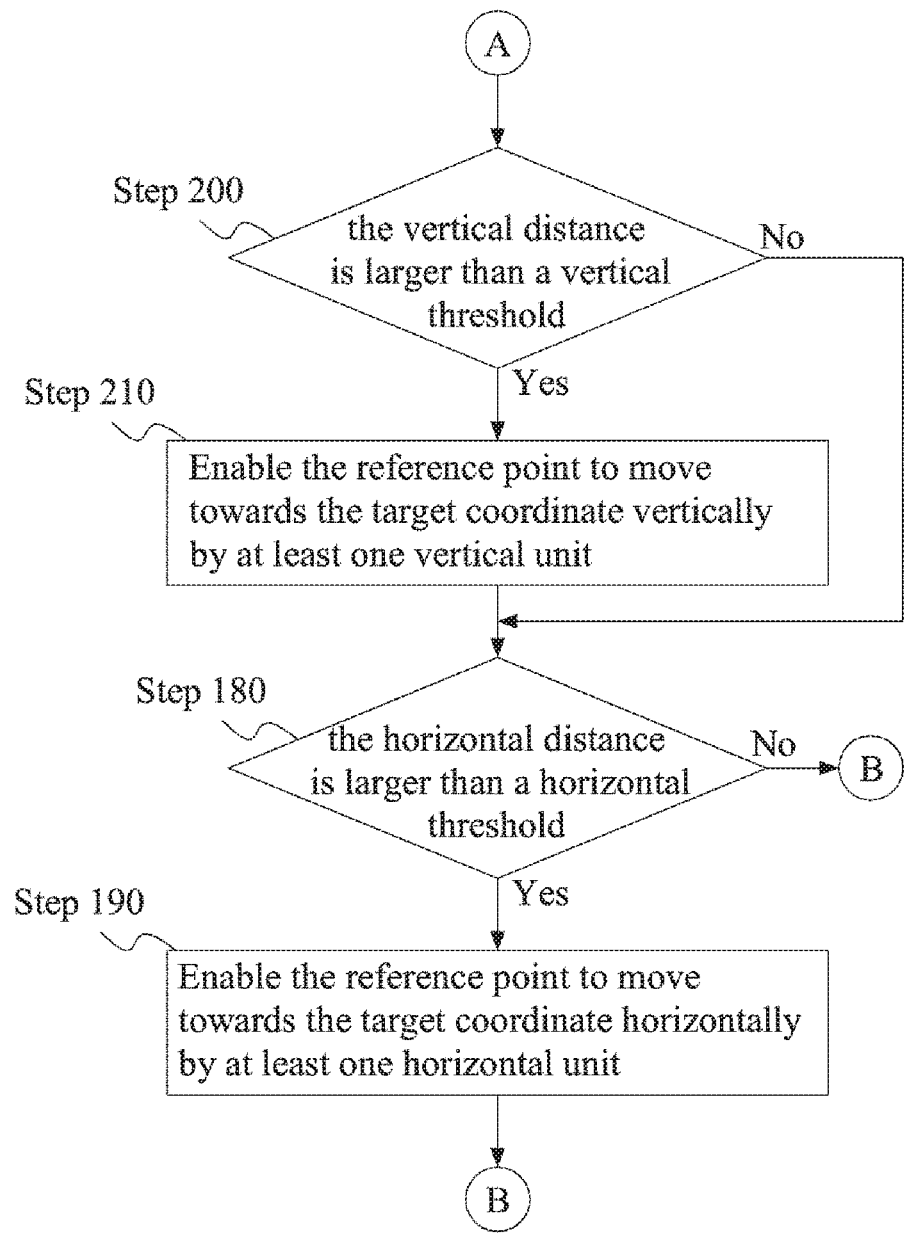
FIG. 12 is another flowchart of an automatic object tracking method according to the present invention.

As shown in FIG. 12, comparison and adjustment in the horizontal coordinate axis X and comparison and adjustment in the vertical coordinate axis Y may be performed in an opposite order or synchronously, and the present invention is not limited to the order in FIG. 11.

If a plurality of feature objects A and A' is recognized in Step 140, the handheld mobile device 100 sets sampling frames F and F' for the feature objects A and A' respectively, and performs the object tracking mode by using a sampling frame F having the largest area.

If a plurality of feature objects A and A' is recognized in Step 140, the handheld mobile device 100 sets sampling frames F and F' for the feature objects A and A' respectively, chooses, according to a required tracking quantity in descending order of area, sampling frames F meeting the tracking quantity, sets an auxiliary frame AF surrounding the chosen sampling frames F, and sets, by using the auxiliary frame AF as a range, the reference point R between the sampling frames F, to perform the object tracking mode.

As shown in FIG. 11, after Step 120, the tracking dock 200 still continuously receives an optical-code signal, and performs comparison to determine whether the optical-code signal includes a stop code. If the optical-code signal includes the stop code, the tracking dock 200 triggers the handheld mobile device 100 to disable the object tracking mode.

In the technical measure provided in the present invention, a tracking motion of an image capturing unit does not follow a human face excessively, so that image capturing data is prevented from becoming excessively shaky, and an image capturing direction is gradually adjusted only when a movement distance exceeds a threshold, so that the image capturing data can be relatively stable, so that the image capturing data can be relatively stable, and a manner of object tracking is relatively smooth.

What is claimed is:

1. An automatic object tracking system, comprising:
a handheld mobile device, comprising:
   a microprocessor, configured to perform an object tracking mode;
   an image capturing unit, electrically connected to the microprocessor, and configured to capture image capturing data in an image capturing direction and transfer the image capturing data to the microprocessor; wherein the microprocessor defines a horizontal coordinate axis and a vertical coordinate axis perpendicular to each other in the image capturing data, defines a length of the image capturing data along the horizontal coordinate axis into a plurality of horizontal units, and defines a height of the image capturing data with respect to the horizontal coordinate axis into a plurality of vertical units;
   a memory unit, electrically connected to the microprocessor, and configured to store the image capturing data;
   a touch-control display panel, electrically connected to the microprocessor, and configured to display the image capturing data, receive a touch control operation, and feedback the touch control operation to the microprocessor; and
   a first communications interface, electrically connected to the microprocessor; and
a tracking dock, comprising:
   a controller;
   a second communications interface, electrically connected to the controller, and configured to establish a communications link with the first communications interface to receive a turning command and transfer the turning command to the controller; and
   a turning module, electrically connected to the controller, and configured to support the handheld mobile device; wherein the controller drives the turning module according to the turning command to turn, to change the image capturing direction of the image capturing unit;
wherein in the object tracking mode, the microprocessor recognizes a feature object from the image capturing data, sets a sampling frame around the feature object to enable the sampling frame to surround the feature object, and moves the sampling frame as the feature object moves; and the microprocessor sets a reference point in the sampling frame;
wherein the microprocessor calculates a horizontal distance and a vertical distance between the reference point and a target coordinate; when the horizontal distance is larger than a horizontal threshold, the microprocessor sends the turning command to drive the turning module to change the image capturing direction, to move the reference point towards the target coordinate horizontally by at least one horizontal unit; and when the vertical distance is larger than a vertical threshold, the microprocessor sends the turning command to control the turning module, to move the reference point in the image capturing data towards the target coordinate vertically by at least one vertical unit; and
wherein when a plurality of feature objects is recognized, the microprocessor sets sampling frames for the feature objects respectively, chooses, according to a required tracking quantity in descending order of area, sampling frames meeting the required tracking quantity, sets an auxiliary frame surrounding the chosen sampling frames, and sets, by using the auxiliary frame as a range, the reference point between the sampling frames, to perform the object tracking mode.

2. The automatic object tracking system according to claim 1, wherein the tracking dock further comprises an optical-code receiving unit, configured to receive an optical-code signal that carries a tracking-start code and transfer the optical-code signal to the controller, to enable the controller to trigger the microprocessor by using the first communications interface and the second communications interface when the tracking-start code is received to start to perform the object tracking mode.

3. The automatic object tracking system according to claim 2, further comprising a remote control device, having:
an encoding circuit, configured to store the tracking-start code;

an optical-code transmission unit, electrically connected to the encoding circuit; and a key group, electrically connected to the encoding circuit, and configured to be pressed to trigger the encoding circuit to drive the optical-code transmission unit to send the optical-code signal that carries the tracking-start code, so that the optical-code signal is received by the optical-code receiving unit of the tracking dock.

4. The automatic object tracking system according to claim 3, wherein when the key group is pressed to form a key combination, the encoding circuit drives the optical-code transmission unit according to the key combination to send the optical-code signal that carries the tracking-start code.

5. An automatic object tracking method, applicable to a handheld mobile device and a tracking dock between which a communications link is established, wherein the handheld mobile device captures image capturing data in an image capturing direction by using an image capturing unit, generates a turning command, and sends the turning command to the tracking dock, the tracking dock is configured to support the handheld mobile device, and receive a turning command to change the image capturing direction, and the method comprises the following steps:

performing an object tracking mode on a feature object in the image capturing data;

defining a horizontal coordinate axis and a vertical coordinate axis that are perpendicular to each other in the image capturing data, defining a length of the image capturing data along the horizontal coordinate axis into a plurality of horizontal units, and defining a height of the image capturing data with respect to the horizontal coordinate axis into a plurality of vertical units;

when the feature object is recognized from the image capturing data, setting a sampling frame to surround the feature object, and setting a reference point in the sampling frame; and calculating a horizontal distance and a vertical distance between the reference point and a target coordinate;

wherein when the horizontal distance is larger than a horizontal threshold, the turning command is issued to change the image capturing direction, to move the reference point towards the target coordinate horizontally by at least one horizontal unit; and when the vertical distance is larger than a vertical threshold, the turning command is issued to change the image capturing direction, to move the reference point in the image capturing data towards the target coordinate vertically by at least one vertical unit; and wherein when a plurality of feature objects is recognized, sampling frames are set for the feature objects respectively, sampling frames meeting a required tracking quantity are chosen according to the required tracking quantity in descending order of area, an auxiliary frame surrounding the chosen sampling frames is set, and the reference point between the sampling frames is set by using the auxiliary frame as a range, to perform the object tracking mode.

6. The automatic object tracking method according to claim 5, further comprises a step for receiving, by the tracking dock, a tracking-start code, triggering the handheld mobile device to perform the object tracking mode.

7. The automatic object tracking method according to claim 6, wherein the step of receiving, by the tracking dock, a tracking-start code comprises: receiving an optical-code signal, and performing comparison to determine whether the optical-code signal comprises the tracking-start code.

8. The automatic object tracking method according to claim 7, further comprising: receiving an optical-code signal, performing comparison to determine whether the optical-code signal comprises a stop code, and triggering the handheld mobile device when the optical-code signal comprises the stop code to disable the object tracking mode.

* * * * *